April 10, 1962   J. G. FARROW   3,029,124

PROCESS FOR PRODUCING POLYETHYLENE MONOFILAMENTS

Filed Aug. 24, 1959

INVENTOR.
JOHN G. FARROW
BY Oscar B. Brumback
HIS ATTORNEY

United States Patent Office 3,029,124
Patented Apr. 10, 1962

3,029,124
PROCESS FOR PRODUCING POLYETHYLENE MONOFILAMENTS
John G. Farrow, Monaca, Pa., assignor to Koppers Company, Inc., a corporation of Delaware
Filed Aug. 24, 1959, Ser. No. 835,500
2 Claims. (Cl. 18—54)

This invention relates generally to the preparation of monofilaments of thermoplastic material and more particularly to a process for the production of monofilaments having uniform characteristics and a smooth exterior surface.

It is conventional practice to extrude molten synthetic resinous materials, such, for example, as polyethylene, polystyrene, polyvinylchloride, polyvinylacetate and various copolymers of these resins from a die as a monofilament and cool this monofilament to a temperature below the heat distortion temperature of the resinous material so as to maintain the monofilament characteristics, this cooling usually being accomplished by immersion of the monofilament in a water bath. Further pieces of equipment support, draw, shape, wind-up, and otherwise handle the extruded monofilament until it is in finished form; such equipment being conventional.

It has been found that the characteristics of the finished product are affected by the manner in which the hot extrudate is cooled after it leaves the extrusion die. An undesirable characteristic that is known as shrink bubbles tends to form in the monofilament; and when the shrink bubbles form within the monofilament they remain in the monofilament. Cooling the monofilament slowly to eliminate the shrink bubbles increases the possibility for localized temperature build-up and hot spots which result in boiling of the water at the surface of the filament, which boiling causes an irregularity (known as boil marks) on the surface of the monofilament. Thus, the use of high water bath temperatures to cool the monofilament slowly and eliminate shrink bubbles tends to increase the boil marks on the monofilament as higher water temperatures cause the water to boil more readily; and the use of low water bath temperature to eliminate the possibility of boil marks increases the tendency for shrink bubbles to be formed. The problem is further enhanced by the characteristics of the thermoplastic material. It has been found, for example, that when polyethylene is used for the production of monofilaments, polyethylene which has a low melt index produces monofilaments having superior aging characteristics than does polyethylene having a high melt index (melt index being a measure of the ease with which the material can be extruded—material which has a low melt index being more difficult to extrude than material which has a high melt index). Since the polyethylene which has a low melt index must be heated to a higher temperature to achieve the same ease of extrusion as can be achieved with a polyethylene of high melt index when extruded at a lower temperature, these higher temperatures increase the difficulties experienced in the cooling of the monofilament.

An object of this invention is to provide for the production of monofilaments of thermoplastic material by a process which substantially eliminates shrink bubbles and boil marks from the monofilament.

Broadly, the process of the invention comprises extruding a hot synthetic resinous material through a die to produce a monofilament, cooling the monofilament with water whose temperature is sufficiently high to cool slowly the monofilament and thereby prevent formation of shrink bubbles in the monofilament, and directing a stream of cooling gas onto the monofilament after it leaves the die but before it is cooled by the water so as to cool the surface of the monofilament sufficiently to prevent localized boiling of the water adjacent the surface of the monofilament. The apparatus for carrying out the invention comprises generally an extruder having a die through which a hot resinous composition is extruded as a monofilament, a water bath through which the monofilament is passed so as to cool the monofilament, and means between the die and the water bath for cooling the surface of the monofilament with a gas after the monofilament leaves the die but before the monofilament enters the water bath.

The above and further objects and novel features of the invention will appear more fully from the following detailed description when the same is read in connection with the accompanying sheet of drawings. It is to be expressely understood, however, that the drawings are not intended as a definition of the invention but are for the purpose of illustration only.

Figure 1:
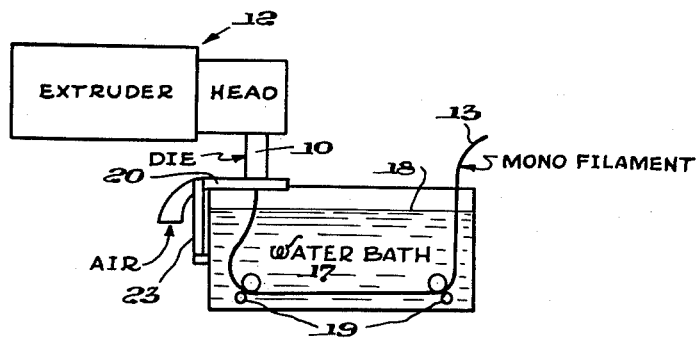
FIGURE 1 illustrates schematically apparatus for carrying out the novel process of this invention.

Referring now to FIGURE 1, the hot thermoplastic material leaves die 10 of extruder 12 as a monofilament or extrudate 13 and passes downward into a water bath 17 which cools the hot monofilament below the heat distortion temperature of the thermoplastic material. The distance between die 10 and surface 18 of water bath 17 depends upon variables such as the temperature of the extrudate and the density and melt index of the particular resinous material; but is readily ascertained by those skilled in the art. Conveniently, a series of rolls 19 pull the monofilament through bath 17. If desired, the monofilament may be stretched as it leaves the die, and after leaving the water bath the monofilament may be subjected to further processing as, for example, tempering or dyeing.

The foregoing apparatus is conventional and its use tends to create shrink bubbles in the monofilament or boil marks on the surface of the monofilament. In accordance with this invention the monofilament is cooled by a gas after it leaves the die and before it enters the water bath.

Figure 2:
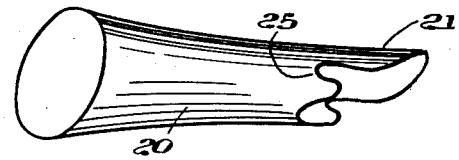
FIGURE 2 illustrates an embodiment of an air cooling device for use with this invention.

An embodiment of an apparatus for cooling the monofilament by air is shown in detail in FIGURE 2. Conveniently, such apparatus may comprise a tube 20 partially flattened at one end 21 and secured between the die 10 and surface 18 of water bath 17 by suitable means such as clamps 23. Because of the difficulty of guiding the monofilament when the extruder is first placed into operation, the clamp is advantageously of the type which permits tube 20 to be readily mounted and dismantled. Thus, after operation is started, the tube can be readily mounted in its operative position. A slot 25 cut through the flattened portion 21 allows the monofilament to pass from the die directly into the water. Tube 20 is connected to a source, not shown, of compressed gas. This gas may be air. Since the monofilament extends through slot 25, the gas flowing through the tube also flows against and around the hot monofilament to cool exterior surface of the monofilament.

The temperature of this gas is not critcial and may be as high, for example, as 200° F. when monofilaments of polyethylene are being extruded. Obviously, however, the cooler the air, the better it functions to cool the monofilament. The velocity with which gas flows through the tube must be low enough not to induce vibration in the monofilament; the maximum velocity depending upon factors such as the tension on the monofilament, the size of the monofilament and the unsupported length of the monofilament between the die and the water.

In accordance with this invention polyethylene, such as sold under the trade name "Super Dylan" by Koppers Company, Inc., having a density of about 0.950 and a melt index of 0.2, was extruded at a temperature of about 400° F. through a circular die having a diameter of 0.04" at a rate of 60' per minute of monofilament. The hot monofilament was passed through a water bath whose temperature was about 150° F. The die was positioned about one half inch from the water surface. There was placed between the water bath and the die an air cooling device as shown in FIGURE 2, and made by flattening conventional ½" O.D. copper tubing to a width of ⅛". Air was passed through the device at a velocity low enough so as not to induce vibration in the monofilament. This air was at room temperature. Although the average temperature of the monofilament was about 375°, the air cooled the surface sufficiently to prevent localized boiling of the water. The resulting polyethylene monofilament was uniform in structure, having no boil marks along the surface and no shrink bubbles on its interior.

The foregoing has presented a novel process for the production of monofilaments from thermoplastic resinous material which monofilaments have a smooth shiny surface substantially free of boil marks and an interior of uniform characteristics, that is, substantially free of shrink bubbles. The foregoing process is readily adaptable for use with conventional apparatus for the production of monofilaments.

I claim:

1. In a process for the production of a monofilament from hot polyethylene wherein polyethylene is extruded as a molten mass through a die to produce a monofilament and then cooled with water having a temperature high enough so as to slowly cool the monofilament and thereby prevent the formation of shrink bubbles, the relative temperature of the water and monofilament being such as to cause localized boiling of the water at the area of immersion of the monofilament in the water resulting in boil marks forming on the monofilament, the improvement which comprises cooling the monofilament with air after the monofilament leaves the die but before cooling the monofilament with water by directing a flow of air generally transversely to the monofilament at a low velocity so as not to produce vibrations in the monofilament, the surface cooling with air preventing localized boiling of the water by the filament that results in boil marks on the filament.

2. A process for the production of a monofilament from hot polyethylene which comprises extruding said polyethylene as a hot mass at a temperature of about 400° Fahrenheit through a die as a monofilament having a diameter of about 0.04 inch at the rate of about sixty feet per minute, cooling the surface of the monofilament with air after the monofilament leaves the die, the air being at room temperature and directed past the monofilament generally transversely thereto at a low velocity so as not to induce vibrations in the monofilament, and thereafter cooling the monofilament slowly with water at a temperature of about 150° F. to prevent the formation of shrink bubbles in the monofilament, the surface cooling with air preventing any localized boiling of the water by the filament that results in boil marks on the filament.

References Cited in the file of this patent

UNITED STATES PATENTS

| | | |
|---|---|---|
| 2,036,174 | Hofmann | Mar. 31, 1936 |
| 2,191,791 | Hardy et al. | Feb. 27, 1940 |
| 2,397,655 | Francis | Apr. 2, 1946 |
| 2,509,119 | Warren | May 23, 1950 |
| 2,539,980 | Van Hall et al. | Jan. 30, 1951 |
| 2,542,973 | Abernethy | Feb. 27, 1951 |
| 2,821,744 | Spohn et al. | Feb. 4, 1958 |

FOREIGN PATENTS

| | | |
|---|---|---|
| 217,642 | Australia | Oct. 14, 1958 |
| 1,024,201 | Germany | Feb. 13, 1958 |